United States Patent
Shin et al.

(10) Patent No.: US 7,035,382 B1
(45) Date of Patent: Apr. 25, 2006

(54) VOICE MAILBOX MANAGEMENT METHOD USING SHORT MESSAGE SERVICE IN VOICE MAIL SYSTEM AND COMPUTER-READABLE MEDIUM THEREFOR

(75) Inventors: Hyun-jung Shin, Seoul (KR); Sang-seo Lee, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 1084 days.

(21) Appl. No.: 09/695,997

(22) Filed: Oct. 26, 2000

(30) Foreign Application Priority Data

Oct. 26, 1999 (KR) ............................... 1999-46627

(51) Int. Cl.
    *H04M 1/64* (2006.01)
(52) U.S. Cl. ............................... 379/88.12; 455/412.2; 455/413
(58) Field of Classification Search ............ 379/88.12, 379/88.27, 93.17, 93.18, 93.23, 93.26, 88.18; 455/412.1, 412.2, 413, 466

See application file for complete search history.

(56) References Cited

U.S. PATENT DOCUMENTS

| 5,177,780 | A | * | 1/1993 | Kasper et al. ............... 455/413 |
| 5,313,515 | A | * | 5/1994 | Allen et al. .................. 455/413 |
| 5,604,921 | A | * | 2/1997 | Alanara ........................ 455/45 |
| 5,802,466 | A | * | 9/1998 | Gallant et al. ............... 455/413 |
| 5,920,822 | A | * | 7/1999 | Houde et al. ................ 455/466 |
| 6,333,973 | B1 | * | 12/2001 | Smith et al. ............. 379/88.12 |
| 6,631,183 | B1 | * | 10/2003 | Rautila et al. ........... 379/88.22 |

* cited by examiner

*Primary Examiner*—Fan Tsang
*Assistant Examiner*—Aung T. Win
(74) *Attorney, Agent, or Firm*—Sughrue Mion, PLLC

(57) ABSTRACT

A voice mailbox management method in a voice mail system through a mutual notification function, between a user mobile telecommunications terminal and a voice mail server, using an extended short message service is provided. According to the voice mailbox management method, when a state change occurs in the voice mailbox of the voice mail server and the voice mailbox of the user mobile telecommunications terminal, a short message indicating the state change is sent to each other, and according to the received short message, the state of the voice mailbox in the voice mail server or the user mobile telecommunications terminal is modified, which enables to keep coherence in identical information in both voice mailboxes of the voice mail server and the user mobile telecommunications terminal.

17 Claims, 11 Drawing Sheets

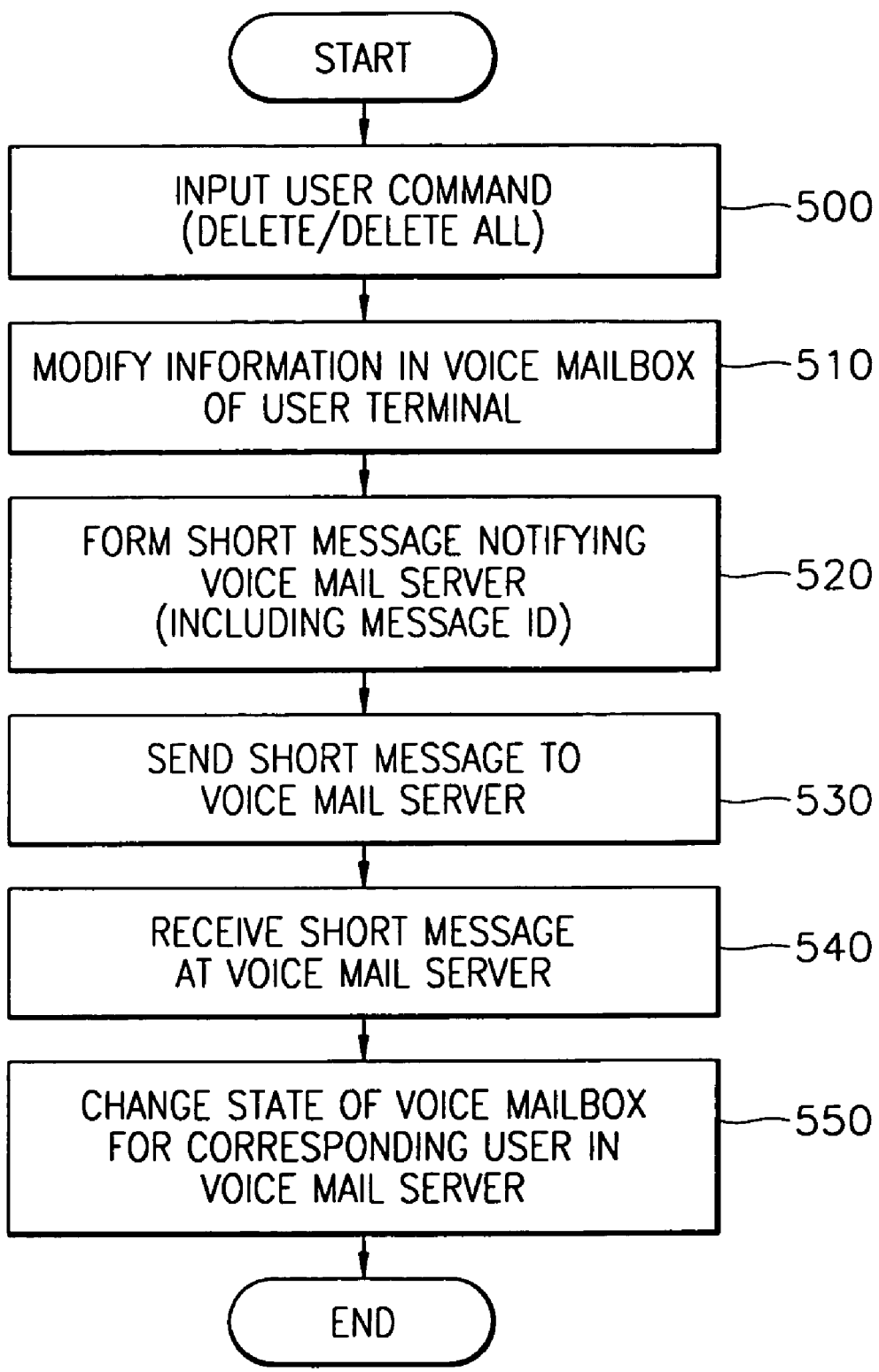

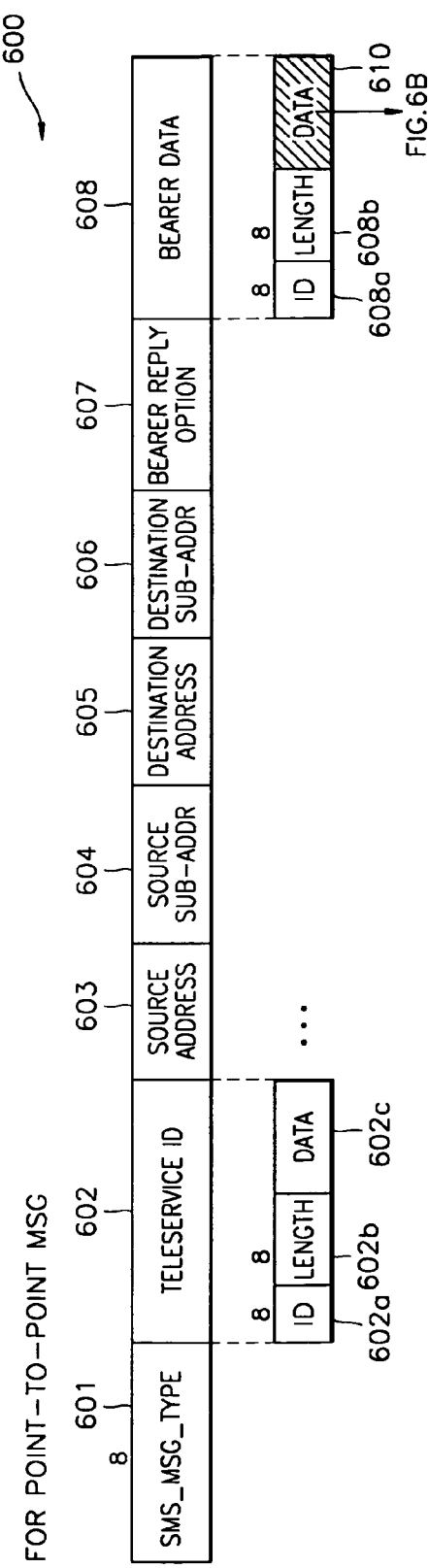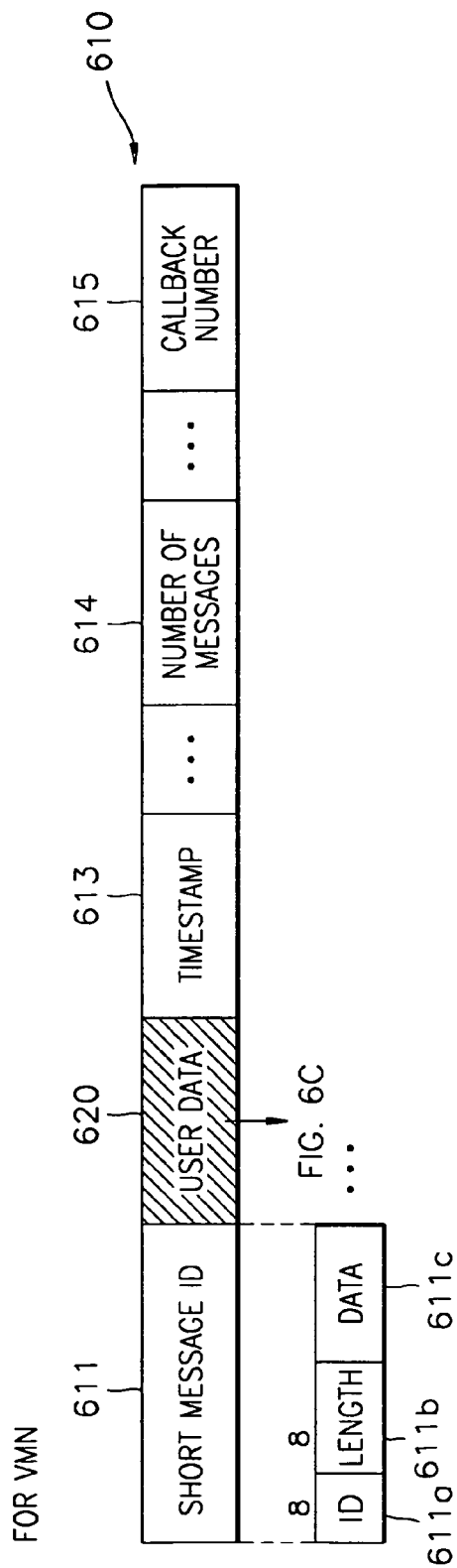

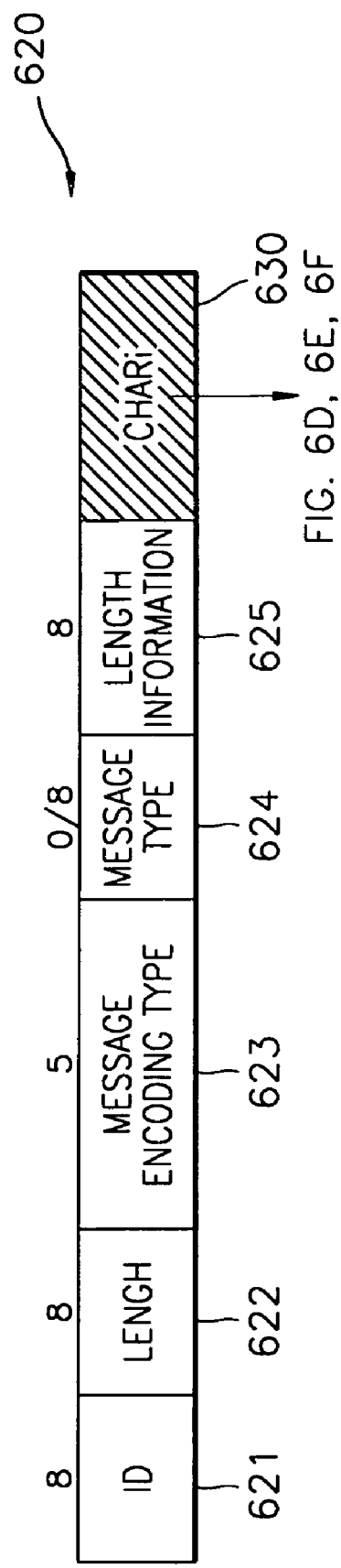

VOICE MAILBOX MANAGEMENT METHOD USING SHORT MESSAGE SERVICE IN VOICE MAIL SYSTEM AND COMPUTER-READABLE MEDIUM THEREFOR

BACKGROUND OF THE INVENTION

1. Field of the Invention

The present invention relates to a voice mail system, and more particularly, to a voice mailbox management method in a voice mail system having a mutual notification function between a user mobile telecommunications terminal and a voice mail server, using an extended short message service.

2. Description of the Related Art

The worldwide market for mobile telecommunication terminals, which provide convenient communication, is rapidly expanding. The technological era of mobile telecommunication terminals which began with analogue cellular phones has seen the introduction of digital cellular phones, and now, personal communications services (PCS) phones. In line with developing mobile telecommunications technologies, access from personal portable/mobile telecommunications terminals (hereinafter, referred to as "a user terminal") to data networks such as the Internet has been enabled, and a variety of character services and data services, such as facsimile, as well as voice services are being offered. Though the term mobile telecommunications services covers all communications services through wireless media in a broad sense, mobile phone service via wireless media will be mainly focused on, here.

In data communication networks such as the Internet, voice mail means an e-mail whose contents are voice data. In general, contents of e-mails are primarily characters. In line with development of multimedia technologies, however, the contents of e-mails are extending to include voice, photos, and images. Meanwhile, voice mail in a mobile telecommunications network means a short message of voice and/or callback number to a corresponding user terminal through a service, usually referred to as a voice mailbox, offered by a voice mail server when establishment of a mobile phone connection to a user terminal fails. When someone telephones through a mobile phone to other user terminal and the user terminal is turned off or is out of a connection-available area, then the call is connected to a voice mailbox in a voice mail server, and a voice message and/or a callback number can be left to the corresponding user terminal in line with guidance of the voice mail server.

FIG. 1A is a schematic diagram of a conventional method for exchanging management information between a user terminal and a voice mail server, and the voice mailbox state of the user terminal and the voice mail server when a new voice message is received in a voice mailbox in the voice mail server.

As shown in FIG. 1A, when a new voice message is received in a mailbox of a voice mail server, the voice mailbox in the voice mail server is set to a "new message 01" state, which means one new voice message is in storage. When a new message is received, the voice mail server waits for the user terminal to return to a connection-available state, and sends a short message informing the user terminal of the arrival of a new voice mail in step 110. A service supporting this transmission of a short message between a user terminal and a voice mail server (through a short message service server) is referred to as a Short Message Service. This is similar to the paging function in pager system. At present, the short message service supports up to about 160 characters. A voice mail notification service which informs a user terminal of the arrival of a voice mail in a voice mail server is a leading short message service.

When a user terminal receives a short message, usually, the arrival of a new message is presented on the display of the user terminal together with an alarm sound, and information on the voice mailbox in the user terminal is set to the "new message 01" state indicating that a new message is present. When an alarm of the user terminal indicates the arrival of a new message, the user is informed of the arrival of the new message in the voice mailbox.

Then, when appropriate, the user telephones the voice mail server in steps 120 and 122, hears the voice message stored in the user's voice mailbox according to guidance of the voice mail server, stores or deletes the message he heard in step 130 and finishes the call connection in step 132.

If the user deleted the voice message the user heard, the voice mailbox state of the voice mail server becomes "new message 00" (more accurately, "new message 00, stored message 00" state), and if the user stored the voice message, the state becomes "new message 00, stored message 01,". However, after the user deletes the voice message in the voice mailbox of the voice mail server and finishes the call connection, information in the voice mailbox of the user terminal maintains the state "new message 01" because a separate short message is not sent between the user terminal and the voice mail server, though the state of the voice mailbox in the voice mail server has changed into "new message 00 (stored message 00)".

Next, the case in which a user changes the voice mailbox state in the user terminal through individual deletion or total deletion will now be examined.

FIG. 1B is a schematic diagram of a conventional method for exchanging management information between a user terminal and a voice mail server, and the voice mailbox state of the user terminal and the voice mail server when a user modifies information of the voice mailbox in the user terminal.

For convenience of explanation, it is assumed that both a voice mailbox of a voice mail server and a voice mailbox of a user terminal are in the "new message 01" state, and the user confirms a callback number included in the new message in the voice mailbox on the user terminal, and deletes the voice message stored in the voice mailbox of the user terminal in step 100. Then, after information indicating that the corresponding message is deleted is presented on the user terminal display, information of the voice mailbox of the user terminal changes to the "new message 00" state. However, though a change in the state of the voice mailbox of the user terminal occurs, the voice mailbox of the voice mail server maintains the "new message 01," state because a separate short message has not been sent between the user terminal and the voice mail server.

In the conventional method, the notification of the arrival of a voice mail to a user terminal is made only when a new voice mail arrives at the voice mailbox of a voice mail server, and when a user changes the voice mailbox state of a voice mail server after connecting to the voice mail server, a separate short message is not sent to the user terminal. Therefore, regardless of the change in the voice mailbox of the voice mail server, the user terminal maintains the existing information until a next new message is sent. After all, when a user deletes the message in a voice mailbox of a voice mail server after connecting to the voice mail server, the voice mailbox of the user terminal continues to maintain the information indicating the corresponding message is in storage, which causes inconsistency between the voice mailbox states of the voice mail server and the user terminal.

In addition, when the user deletes information stored in the voice mailbox of the user terminal, the deletion is made only in the user terminal and the state of the voice mailbox of the voice mail server does not change. Therefore, when a user changes information in the voice mailbox of the user terminal, inconsistency between the voice mailbox states of the voice mail server and the user terminal occurs.

Also, because new messages and stored messages are not separately managed in the voice mailbox of a user terminal, an inconsistent aspect exists considering that new messages and stored messages are separately stored and managed in a voice mailbox of a voice mail server.

The inconsistency occurs because management information is not exchanged in real-time mode between the mailboxes of a user terminal and a voice mail server. Users feel substantial confusion due to the inconsistency between the voice mailbox states between user terminals and a voice mail server, but nothing has been stipulated for the problem in the current short message service for the voice mail system.

SUMMARY OF THE INVENTION

To solve the above problems, it is an objective of the present invention to provide a voice mailbox management method in a voice mail server and a user terminal using extended short messages, after defining an extended short message to mutually notify a voice mail system of a user terminal and a voice mail server of mailbox state changes in the voice mail system of a user terminal and the voice mail server, and a computer-readable medium therefor.

To accomplish the above object of the present invention, there is provided a voice mailbox management method in a user mobile telecommunications terminal using a short message, the voice mailbox management method having the steps of:(a) accessing a voice mail server, receiving a new or stored voice message stored in the voice mailbox of the voice mail server, and outputting the voice message to a user in a spoken language; (b) sending a user input for storing a new voice message or deleting a new or stored voice message stored in the voice mailbox of the voice mail server, to the voice mail server, and finishing the access to the voice mail server; (c) when the state change in a voice message stored in the voice mailbox of the voice mail server occurs due to the user input sent in the step (b), receiving from the voice mail server a short message indicating the state change of a voice message stored in the voice mailbox of the voice mail server; and (d) according to the state change of the voice message stored in the voice mailbox of the voice mail server, which is indicated through the short message received in the step (c), modifying information about the voice message stored in the voice mailbox of the user mobile telecommunication terminal.

It is preferable that in the step (c), a short message including a message identifier of a voice message of which the state was changed from a new state to a stored state, and/or a message identifier which was deleted from a new state or a stored state in the voice mailbox of the voice mail server, is received, or a short message including a message identifier of a new voice message and/or a message identifier of a stored voice message, both of the messages being stored in the voice mailbox of the voice mail server, is received after the occurrence of a state change of a new or stored voice message stored in the voice mailbox of the voice mail server occurs.

To accomplish another object of the present invention, there is provided a voice mailbox management method in a voice mail server using a short message, the voice mailbox management method having the steps of: (a) sending a new or stored voice message stored in the voice mailbox of the voice mail server to a user mobile telecommunications terminal connected to the voice mail server; (b) receiving a command for storing a new voice message or for deleting a new or stored voice message, both the messages stored in the voice mailbox of the voice mail server, from the user mobile telecommunications terminal connected to the voice mail server; (c) changing the state of a voice message stored in the voice mailbox of the voice mail server in accordance with the command received in the step (b); and (d) sending a short message indicating the state of the voice message stored in the voice mailbox of the voice mail server changed in the step (c), to the user mobile telecommunications terminal.

It is preferable that in the step (d), a short message including a message identifier of a voice message of which state was changed from a new state to a stored state, and/or a message identifier which was deleted from a new state or a stored state in the voice mailbox of the voice mail server, is sent or a short message including a message identifier of a new voice message and/or a message identifier of a stored voice message, both messages stored in the voice mailbox of the voice mail server, is sent after the state change of the voice message stored in the voice mailbox of the voice mail server occurs in the step (c).

To accomplish another object of the present invention, there is provided a voice mailbox management method for a voice mail server using a short message, the voice mailbox management method having the steps of: (a) receiving a new voice message for a user mobile telecommunications terminal in a voice mail server; (b) assigning a message identifier for the new message received in the step (a) in the voice mail server, and storing the message identifier with the new voice message received in the step (a) in the voice mailbox of the voice mail server; (c) forming a short message including the message identifier of the new voice message assigned in the step (b) for indicating the new message stored in the voice mailbox of the voice mail server, to the user mobile telecommunications terminal; and (d) sending the short message formed in the step (c), including the identifier of the new voice message, to the user mobile telecommunications terminal from the voice mail server.

To accomplish another object of the present invention, there is provided a voice mailbox management method using a short message for a user mobile telecommunications terminal, the voice mailbox management method having the steps of: (a) receiving user input modifying information about a new or stored voice message stored in the voice mailbox of the user mobile telecommunications terminal; (b) modifying information of a voice message stored in the voice mailbox of the user mobile telecommunications terminal, according to the user input received in the step (a); (c) forming a short message notifying the voice mail server of the modification of information on a voice message stored in the voice mailbox of the user mobile telecommunications terminal; and (d) sending the short message, formed in the step (c), notifying the voice mail server of the modification of information on a voice message stored in the voice mailbox of the user mobile telecommunications terminal.

To accomplish another object of the present invention, there is provided a voice mailbox management method of a voice mail server using a short message, the voice mailbox management method having the steps of: (a) receiving a short message indicating the modification of information on a new or stored message stored in the voice mailbox of a user mobile telecommunications terminal from the user mobile telecommunications terminal; and (b) changing the state of a voice message stored in the voice mailbox of the user mail server, according to the modification of information of the voice message stored in the voice mailbox of the user mobile telecommunications terminal, which was notified through the short message received in the step (a).

To accomplish another object of the present invention, there is provided a computer readable medium having embodied thereon a computer program for a voice mail system, between a user mobile telecommunications terminal and a voice mail server, managing voice mailboxes using a short message, in which the voice mailbox management method comprises the steps of: (a) receiving a new or stored voice message stored in the voice mailbox of the voice mail server, and outputting the voice message through the user mobile telecommunications terminal in a spoken language; (b) sending a user input for storing a new voice message or deleting a new or stored voice message stored in the voice mailbox of the voice mail server, to the voice mail server, and finishing the access to the voice mail server; (c) when the state change in a voice message stored in the voice mailbox of the voice mail server occurs due to the user input sent in the step (b), receiving from the voice mail server a short message notifying the state change of a voice message stored in the voice mailbox of the voice mail server; and (d) according to the state change of the voice message stored in the voice mailbox of the voice mail server, which is indicated through the short message received in the step (c), modifying information about the voice message stored in the voice mailbox of the user mobile telecommunication terminal.

To accomplish another object of the present invention, there is provided a computer readable medium having embodied thereon a computer program for a voice mail system, between a user mobile telecommunications terminal and a voice mail server, managing voice mailboxes using a short message, in which the voice mailbox management method comprises the steps of: (a) sending a new or stored voice message stored in the voice mailbox of the voice mail server to a user mobile telecommunications terminal connected to the voice mail server; (b) receiving a command for storing a new voice message or for deleting a new or stored voice message, both the messages stored in the voice mailbox of the voice mail server, from the user mobile telecommunications terminal connected to the voice mail server; (c) changing the state of a voice message stored in the voice mailbox of the voice mail server in accordance with the command received in the step (b); and (d) sending a short message indicating the state of the voice message stored in the voice mailbox of the voice mail server changed in the step (c), to the user mobile telecommunications terminal.

To accomplish another object of the present invention, there is provided a computer readable medium having embodied thereon a computer program for a voice mail system, between a user mobile telecommunications terminal and a voice mail server, managing voice mailboxes using a short message, in which the voice mailbox management method comprises the steps of: (a) receiving a new voice message for a user mobile telecommunications terminal; (b) assigning a message identifier for the new message received in the step (a), and storing the message identifier with the new voice message received in the step (a) in the voice mailbox of the voice mail server; (c) forming a short message including the message identifier of the new voice message assigned in the step (b) for notifying the user mobile telecommunications terminal that the new message is stored in the voice mailbox of the voice mail server; and (d) sending the short message formed in the step (c), including the identifier of the new voice message, to the user mobile telecommunications terminal from the voice mail server.

To accomplish another object of the present invention, there is provided a computer readable medium having embodied thereon a computer program for a voice mail system, between a user mobile telecommunications terminal and a voice mail server, managing voice mailboxes using a short message, in which the voice mailbox management method comprises the steps of: (a) receiving a user input modifying information about a new or stored voice message stored in the voice mailbox of the user mobile telecommunications terminal; (b) modifying information of a voice message stored in the voice mailbox of the user mobile telecommunications terminal, according to the user input received in the step (a); (c) forming a short message notifying the voice mail server of the modification of information on a voice message stored in the voice mailbox of the user mobile telecommunications terminal; and (d) sending the short message, formed in the step (c), notifying the voice mail server of the modification of information on a voice message stored in the voice mailbox of the user mobile telecommunications terminal.

To accomplish another object of the present invention, there is provided a computer readable medium having embodied thereon a computer program for a voice mail system, between a user mobile telecommunications terminal and a voice mail server, managing voice mailboxes using a short message, in which the voice mailbox management method comprises the steps of: (a) receiving a short message indicating the modification of information on a new or stored message stored in the voice mailbox of a user mobile telecommunications terminal from the user mobile telecommunications terminal; and (b) changing the state of a voice message stored in the voice mailbox of the user mail server, according to the modification of information of the voice message stored in the voice mailbox of the user mobile telecommunications terminal, which was notified through the short message received in the step (a).

BRIEF DESCRIPTION OF THE DRAWINGS

The above objectives and advantages of the present invention will become more apparent by describing in detail a preferred embodiment thereof with reference to the attached drawings in which:

FIG. 5 is a flowchart for showing a voice mailbox management method using a short message service, which notifies a voice mail server of modification of information in a user terminal, according to a desirable embodiment of the present invention; and FIGS. 6A through 6F are schematic diagrams for showing the protocol data structure of short message services used in a voice mailbox management method according to an embodiment of the present invention.

DETAILED DESCRIPTION OF THE INVENTION

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to anyone skilled in the art.

Figure 1A:
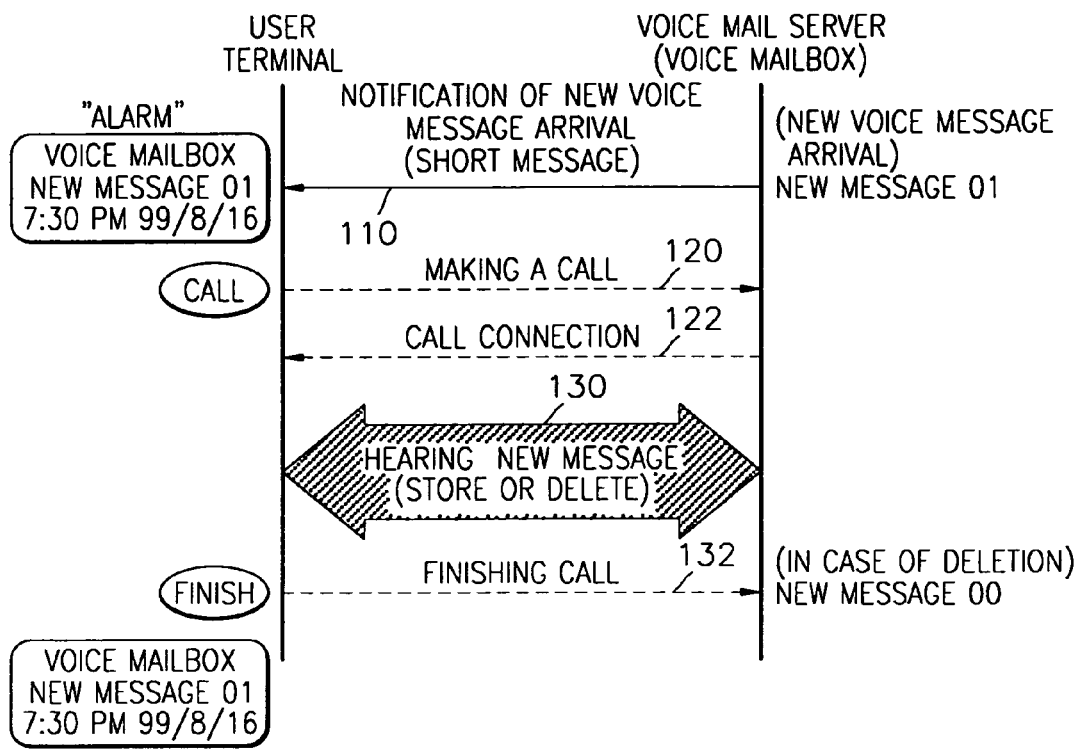
FIG. 1A is a schematic diagram of a method for exchanging management information when a new voice message is received in a conventional voice mail server.
Figure 1B:
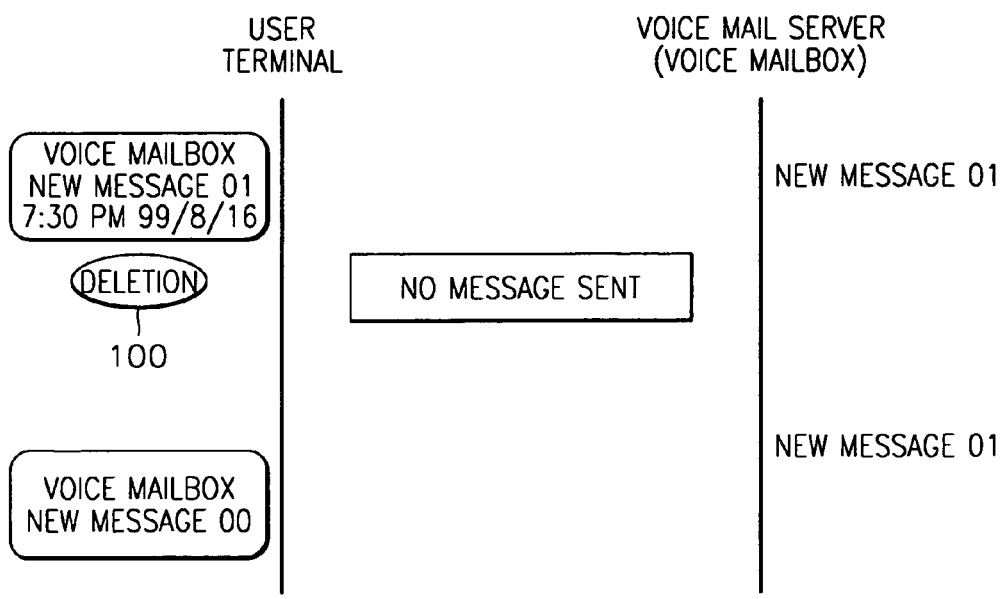
FIG. 1B is a schematic diagram of a method for exchanging management information when a user modified information on a voice mailbox in a conventional user terminal.
Figure 2A:
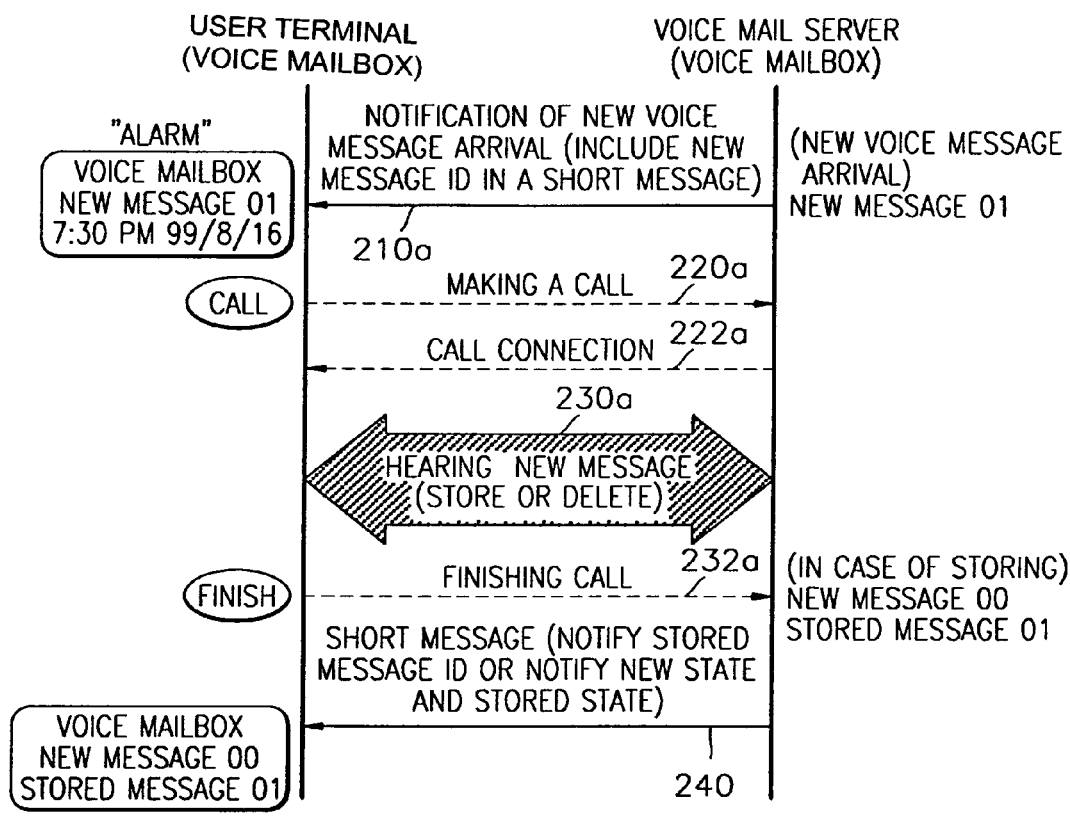
FIGS. 2A and 2B are schematic diagrams of a method for exchanging management information when a new voice message is received in a voice mail server according to an embodiment of the present invention.
Figure 2B:
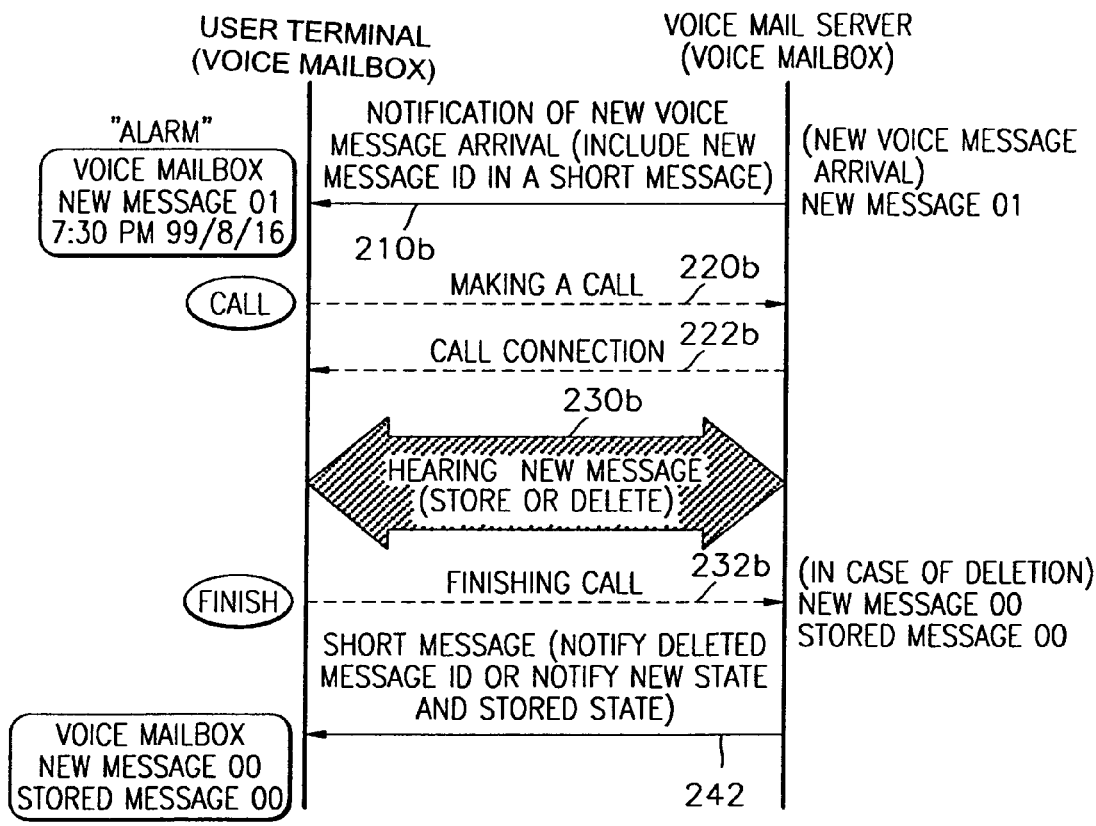

FIGS. 2A and 2B are schematic diagrams of a method for exchanging management information between a user terminal and a voice mail server and the voice mailbox states of the user terminal and the voice mail server when a new voice message is received in the voice mailbox of the voice mail server, according to an embodiment of the present invention.

Figure 3:
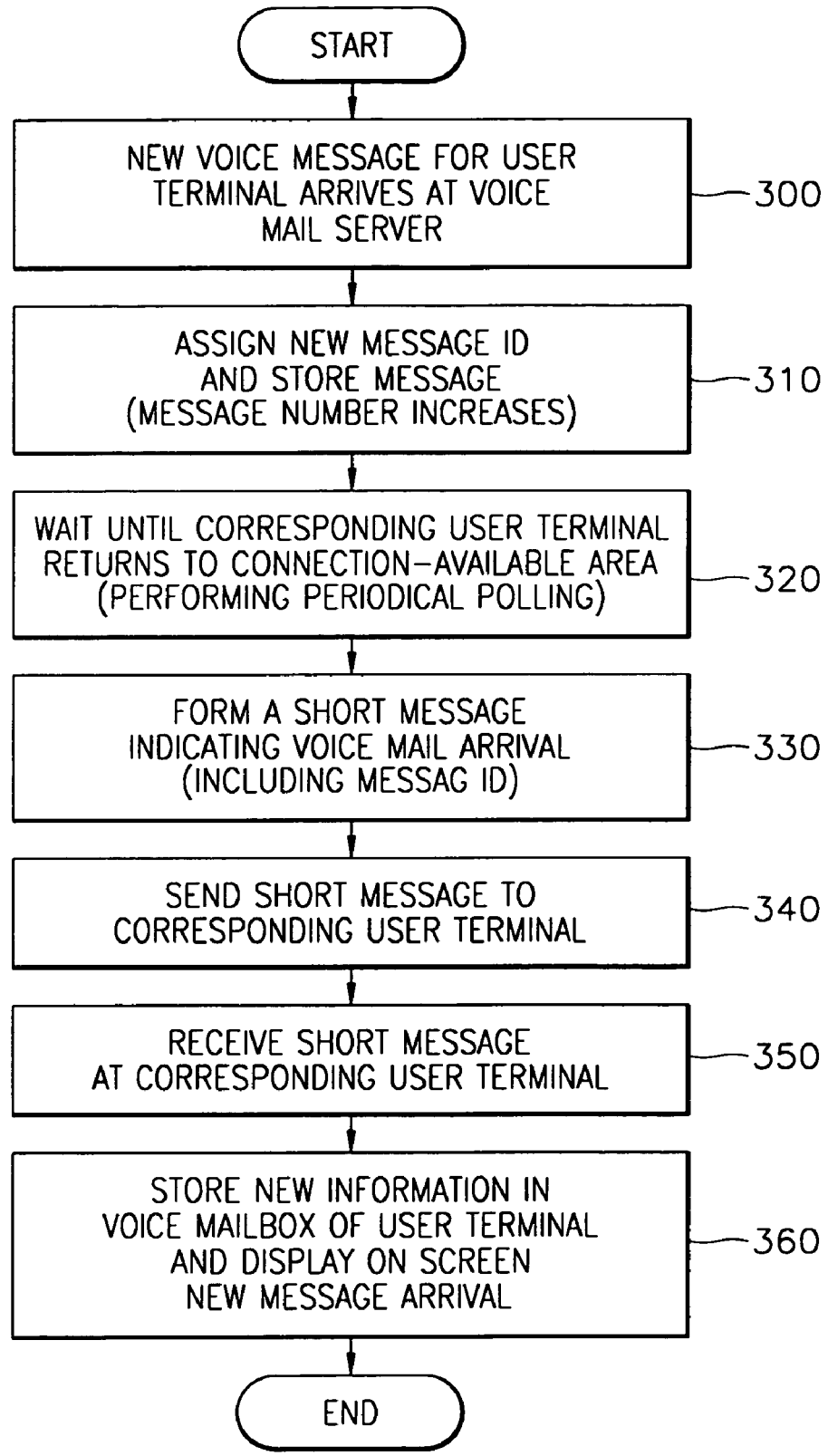
FIG. 3 is a flowchart for showing a voice mailbox management method using a short message service, which notifies a user of arrival of a new message, according to a desirable embodiment of the present invention.

As shown in FIG. 2A, the voice mailbox of a voice mail server changes into a "new message 01" state when a new message is received. When a new message is received, the voice mail server waits for the user terminal to go back to a connection-available state, and sends a short message informing the user of the arrival of a new voice mail in step 210A. Unlike the conventional short message which notifies the user of the arrival of a new voice message, the short message of the embodiment of the present invention includes a message identifier (hereinafter referred to as "message ID") of a new voice message. The specific protocol data structure of the short message will be described when FIG. 6 is explained, and the voice mailbox management method using a method in which a short message that notifies the user of the arrival of a new voice message includes a message ID of a new voice message according to an embodiment of the present invention, will be described when FIG. 3 is explained.

When a user terminal is out of a connection-available area, a plurality of voice messages can be received in the voice mailbox of a voice mail server. If a user terminal goes back to a connection-available state when a plurality of new voice messages are in storage in the voice mailbox of the voice mail server, the voice mail server notifies the user terminal through a short message of the number of new messages, including the voice messages which have not been heard.

The user terminal, when receiving the short message, gives a normal alarm and presents the arrival of a new message on the display of the user terminal. The information of the voice mailbox of the user terminal also changes into the "new message 01" state. Since the short message generally includes the arrival time of the corresponding voice message, the voice mailbox of the user terminal stores a time-stamp of the receiving time of the corresponding message. In addition, a message ID of the corresponding message, which is included in the received short message, is also stored in the voice mailbox of the user terminal according to an embodiment of the present invention and each message is managed by using the message IDs.

When an alarm is given to inform the user of the arrival of a new message, the user confirms the new message which arrived at the voice mailbox of the user terminal. Then, when appropriate, the user makes a phone call or a connection to the voice mail server in steps 220A and 222A, hears the voice messages stored in his voice mailbox according to guidance of the voice mail server, stores or deletes messages he heard in step 230A, and finishes the call connection, that is, finishes connection to the voice mail server, in step 232A.

When the user stores a new voice message he heard, the state of voice mailbox of the voice mail server becomes "new message 00, stored message 01,", and when the user deletes a new voice message he heard, the state of voice mailbox of the voice mail server becomes "new message 00, stored message 00". When the user finishes the phone connection without storing or deleting the message, it is generally regarded as storing.

Unlike the conventional method, according to the embodiment of the present invention, when a state change in new or stored messages in the voice mailbox of the voice mail server occurs, a short message to notify the user of the corresponding message ID is sent to the user terminal in step 240. The voice mailbox management method using a short message which notifies a state change in the voice mailbox of a voice mail server according to an embodiment of the present invention will be explained in detail in FIG. 4.

A state change in the voice mailbox of a voice mail server (excluding the arrival of new message) can occur when a new message is stored, when a new message is deleted, or when a stored message is deleted. FIG. 2A shows the occurrence of a state change in the voice mailbox of a voice mail server due to storing a new message.

As shown in FIG. 2A, when a user stores a voice message which is in the voice mailbox of a voice mail server and finishes the call, the state of the voice mailbox of the voice mail server changes from a state "new message 01" to "new message 00, stored message 01,". Therefore, the voice mail server transmits, to the user terminal, a short message that the state of the voice mailbox has changed in step 240. When the user terminal receives from the voice mail server the short message indicating that the state of the voice mailbox has changed, the user terminal modifies information in the voice mailbox of the user terminal according to the state change of the voice mailbox of the voice mail server. FIG. 2A shows that information in the voice mailbox of the user terminal changes into a state "new message 00, stored message 01" after receiving the short message in the user terminal.

Next, the state change of the voice mailbox of a voice mail server due to deletion of a new message will now be explained. FIG. 2B shows the occurrence of a state change in the voice mailbox of a voice mail server due to deleting a new message. Processing steps of reference numerals 210B, 220B and 222B perform functions corresponding to the processes of reference numerals 210A, 220A, and 222A, respectively.

Referring to FIG. 2B, when a user deletes a voice message in the voice mailbox of a voice mail server in step 230B, and finishes the call connection in step 232B, the state of voice mailbox in the voice mail server changes from a state "new message 01," to "new message 00, stored message 00". According to this, the voice mail server transmits to the user terminal a short message indicating that a change in the state of the voice mailbox occurred in step 242. Then, the user terminal modifies information in the voice mailbox of the user terminal according to the received short message. FIG. 2B shows information in the voice mailbox of the user terminal changes into "new message 00, stored message 00" after receiving a short message in the user terminal.

Figure 2C:
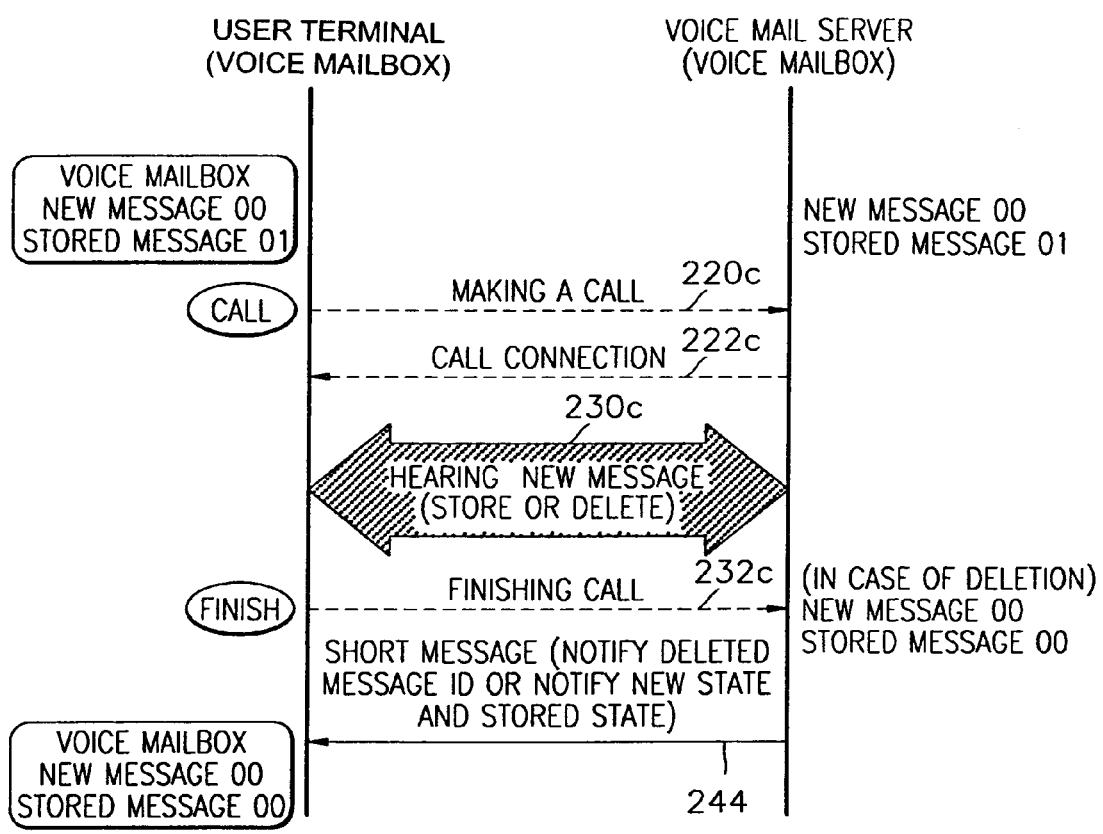
FIG. 2C is a schematic diagram of a method for exchanging management information when a stored voice message is deleted in a voice mail server according to an embodiment of the present invention.

Next, the occurrence of a state change in the voice mailbox of a voice mail server due to deletion of a stored message will now be explained. FIG. 2C is a schematic diagram of a method for exchanging management information and the states of the voice mailbox in a user terminal and the voice mailbox in a voice mail server, when a stored voice message is deleted in a voice mail server, according to the present invention.

First, it is assumed that the states of both the voice mailbox of a user terminal and the voice mailbox of a voice mail server are "new message 00, stored message 01", as in the case of FIG. 2A in which a new message is stored.

Then, at a time desired by a user, in order to confirm again voice messages stored, the user establishes a link to or accesses the voice mail server in steps 220C and 222C; the user hears the voice message stored in the voice mail server and deletes the message in step 230C; and the user hangs up in step 232C. Then, the state of the voice mailbox of the voice mail server changes from "new message 00, stored message 01," to "new message 00, stored message 00". When the state of the voice mailbox of the voice mail server changes due to deletion of the stored message, the voice mail server transmits to the user terminal a short message indicating that a state change of the voice mailbox occurred in step 244. Then, the user terminal modifies information of the voice mailbox of the user terminal in accordance with the received short message. FIG. 2C shows information in the voice mailbox of the user terminal changes from "new message 00, stored message 01" to "new message 00, stored message 00", after the user terminal receives the short message.

Unlike the previous art, the voice mailboxes of a user terminal of the embodiments of the present invention manage information of each voice message after dividing information into a new or stored state. This is to make those messages correspond to those in the voice mailbox of a voice mail server, because the latter are managed after being divided into a new or stored state.

According to the embodiment of the present invention, so far explained are a case in which the arrival of a new message is notified, a case in which a state change of the voice mailbox of a voice mail server occurs due to storing a new message, a case in which a state change of the voice mailbox of a voice mail server occurs due to deleting a new message, and a case in which a state change of the voice mailbox of a voice mail server occurs due to deleting a stored message. Next, a case in which when information of the voice mailbox of a user terminal is modified (including being deleted), the modified information is sent to the voice mail server through a short message according to the present invention will now be explained.

Figure 2D:
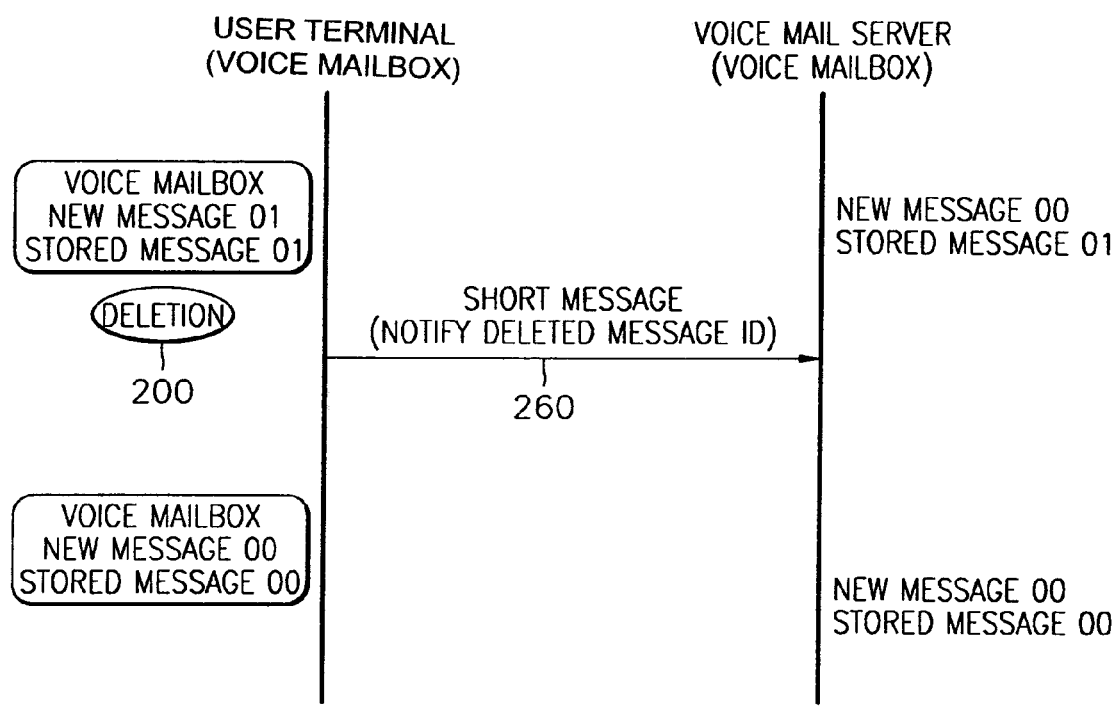
FIG. 2D is a schematic diagram of a method for exchanging management information when a user modifies information of a voice mailbox in a user terminal according to an embodiment of the present invention.

FIG. 2D is a schematic diagram of a method for exchanging management information and the states of both the voice mailbox of the user terminal and the voice mailbox of the voice mail server, according to an embodiment of the present invention, when a user modifies (including deleting) information of the voice mailbox of the user terminal.

First, it is assumed that the states of both a user terminal and the mailbox of a voice mail server are "new message 00, stored message 01", as the case of FIG. 2A in which a new message is stored.

When a user determines that a certain voice message stored in the voice mailbox of a voice mail server need not be stored any more, the user deletes the message in the voice mailbox of the user terminal in step 200. After information that the message has been deleted is displayed on the screen of the user terminal, the information of the voice mailbox of the user terminal changes from "new message 00, stored message 01" to "new message 00, stored message 00".

Unlike the previous art, according to the embodiment of the present invention, even when information of the voice mailbox of the user terminal is modified in the step 200 by individual deletion or entire deletion (deleting all) of new or stored message information stored in the voice mailbox of the user terminal, a short message is transmitted from the user terminal to the voice mail server to notify the voice mail server of a message ID of the corresponding message, in step 260. This is to make the voice mailbox of the voice mail server correspond to the voice mailbox of the user terminal. A voice mailbox management method, according an embodiment of the present invention, using a short message notifying the voice mail server of the modification of the voice mailbox information of a user terminal will be explained in detail in FIG. 5.

Referring to FIG. 2D, when a user deletes a message stored in the voice mailbox of the user terminal, information of voice mailbox of the user terminal is modified in the step 200, and the user terminal transmits a short message notifying a voice mail server of the corresponding message ID, in step 260. When the voice mail server receives the short message indicating that information of the voice mailbox of the user terminal is modified, the voice mailbox of the voice mail server is modified in accordance with the short message. FIG. 2D shows that the state of the voice mailbox of the voice mail server changes from "new message 00, stored message 01" to "new message 00, stored message 00", after the short message is received in the voice mail server.

A voice mailbox management method using a short message for indicating the arrival of a new message; a voice mailbox management method using a short message for indicating the state change of the voice mailbox of a voice mail server; and a voice mailbox management method using a short message for notifying the information modification of the voice mailbox of a user terminal according to the embodiments of the present invention will now be explained.

First, the voice mailbox management method using a short message for indicating the arrival of a new message will be explained.

FIG. 3 is a flowchart showing a voice mailbox management method in a voice mail system using a short message, including the message identifier of a new message, indicating the arrival of a new message according to an embodiment of the present invention.

First, a new voice message for a certain user terminal arrives at a voice mail server in step 300. The voice mail server manages the voice mailbox for each user terminal. Then, a new or stored message is stored in each voice mailbox.

When a new voice message arrives at the voice mail server, the voice mail server identifies the corresponding user terminal, and assigns a message ID to the new voice message. In addition, the voice mail server increases the total number of new messages stored in the voice mailbox for the corresponding user terminal. Since message IDs are given to each user terminal, identical message IDs can be used in other user terminals. Also, since the capacity of the voice mailbox for each user terminal on the voice mail server must have some limitations, it is preferable that the length of a message ID is the bit length which can represents the total number of messages that can be stored in each voice mailbox. For example, total 256 messages can be expressed using an 8-bit message ID. Since total number of messages that can be stored in each voice mailbox does not exceed 100 in general, an 8-bit length is enough as the bit length of a message ID.

The fact that a new voice message for a certain user terminal arrives at the voice mail server means that connection cannot be established with the corresponding user terminal because the corresponding user terminal is turned off, or is out of a connection-available area. Therefore, before sending a short message indicating the arrival of a new voice message to the corresponding user terminal, the voice mail server waits until the corresponding user terminal returns to a connection-available area in step 320. As a method for determining whether or not the corresponding user terminal returns to a connection-available area, the corresponding user terminal can be periodically polled by the voice mail server, or the corresponding user terminal can inform the voice mail server of its return to a connection-available area.

Another new message for the corresponding user terminal can arrive at the voice mail server while the voice mail server is waiting for the user terminal to return to a connection-available area in step 300. Then, a message ID for another new message is assigned, and the total number of new messages is increased again in step 310. That is, during the waiting state of the step 320, the steps 300 and 310 can be repeated.

When the user terminal returns to a connection-available area, the voice mail server forms a short message for indicating the arrival of a new message in step 330, and transmits the short message to the corresponding user terminal in step 340. This short message includes the message ID of each new message assigned in the step 310. At the same time, it generally includes the total number of new messages currently stored in the voice mailbox.

Here, when a plurality of new messages are stored in the current voice mailbox, a short message indicating the arrival of a new message for each new message is sequentially transmitted in general. In this case, the message ID of the corresponding new message is included in each short message, and the total number of new messages currently stored in the voice mailbox is set to a value excluding new messages that arrive after the receipt of the corresponding new message.

However, as the case may be, when a user returns to a connection-available area, it will occur to one having skill in the art that it is preferable that one short message having information about all new messages currently stored in the voice mail server is transmitted. In such a case, a short message must include message IDs of all new messages currently stored in the voice mailbox. The detailed protocol data structure of a short message formed in the step 330 will be explained in FIG. 6.

Referring to FIG. 3, the step 330 for forming a short message is shown after the step 320 for waiting for the user terminal to return to a connection-available area. However, when a new message for a certain user terminal arrives, the voice mail server can assign a message ID in the step 310, form a short message having this message ID before the step 320, and send the corresponding short message when the user terminal returns to a connection-available area. In addition, as the case may be, the voice mail server can store a new voice message in the voice mailbox of the corresponding user terminal; assign a new message ID at the time when the user terminal returns to a connection-available area; and form a short message for indicating the arrival of the corresponding new message.

The user terminal receives the short message sent in the step 340 in step 350. Then, referring to the message ID and time stamp included in the received short message, the user terminal stores information about the new voice message in the voice mailbox of the user terminal. In addition, the user terminal increases the total number of new messages in the voice mailbox of the user terminal, and displays the arrival of a new message on the screen of the user terminal, usually together with an alarm sound in step 360. That is, each voice message stored in the voice mailboxes of the voice mail server and the user terminal is managed through the message ID, and the short message for indicating the arrival of a new message includes the message ID of a new message.

So far, the voice mailbox management method using a short message having the message ID of a new message for indicating the arrival of a new message has been explained. Next, a voice mailbox management method using a short message for indicating the state change of the voice mailbox of the voice mail server will now be explained.

Figure 4:
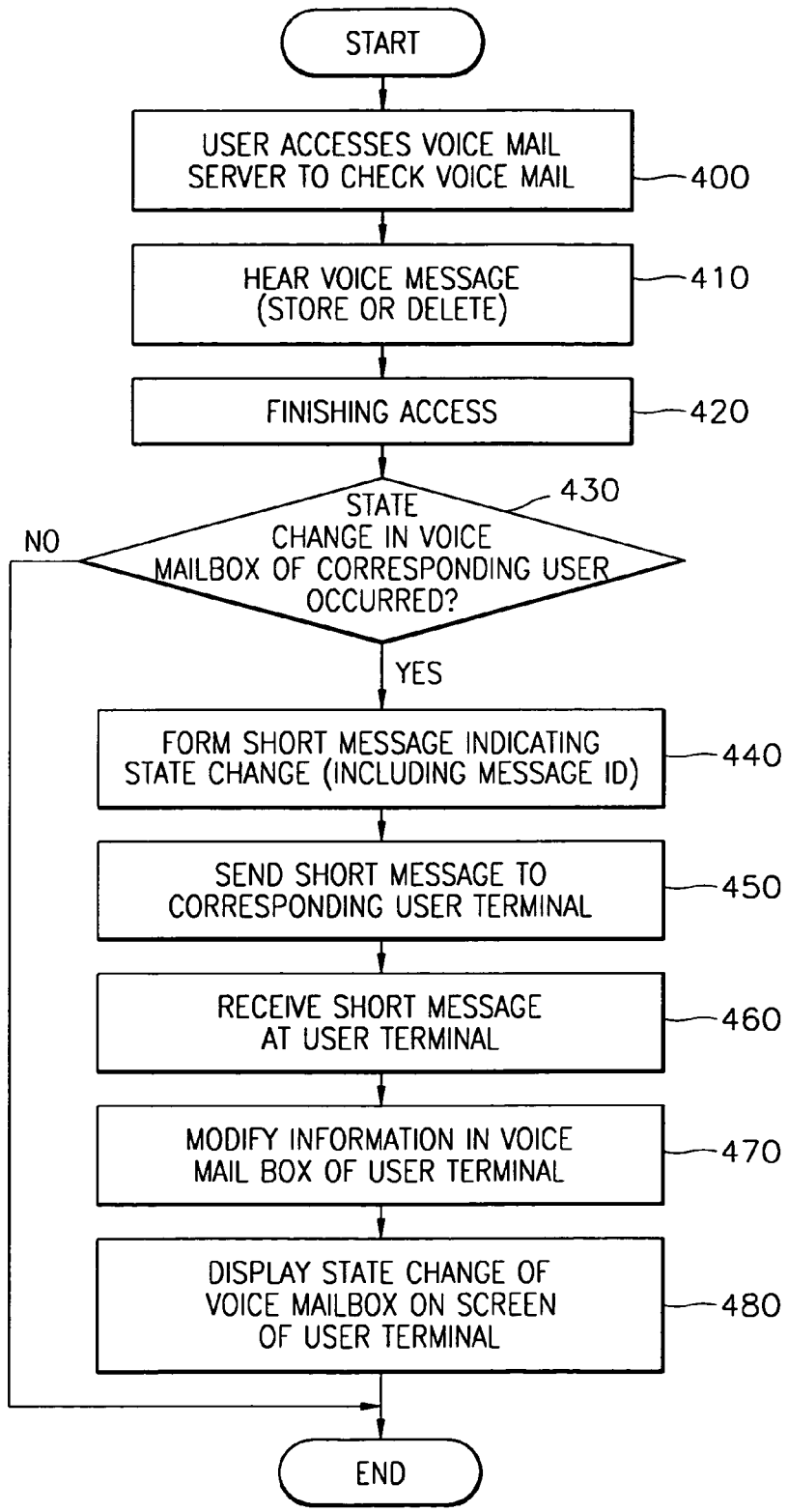
FIG. 4 is a flowchart for showing a voice mailbox management method using a short message service, which notifies a user of state changes in a voice mail server, according to a desirable embodiment of the present invention.

FIG. 4 is a flowchart for showing a voice mailbox management method using a short message for indicating the state change of the voice mailbox of the voice mail server, according to the present invention.

First, when an alarm for indicating the arrival of a new message rings, the user confirms information about the new message through the voice mailbox of the user terminal. In the voice mailbox of the user terminal, the time stamp of the new message which arrived at the voice mail server, the callback number, and information about the total number of new messages currently stored in the voice mail server are managed. In addition, the message ID information of each voice message used internally in the process for exchanging information with the voice mail server is also managed.

A user accesses the voice mail server in order to confirm voice mail stored in the voice mail server in a proper time in step 400. Usually a user accesses the voice mail server in order to check new messages, but as the case may be, in order to hear stored voice messages again.

When connected to the voice mail server, a user hears a message stored in the voice mailbox for the user terminal in the voice mail server, according to the guide being provided by the voice mail server, in step 410. When the message the user hears is a new message, the user sends a command for deleting or storing the new message to the voice mail server. When the message is a stored message, the user sends a command for keeping it stored or deleting it, according to guide from the voice mail server. According to the commands, the voice mail server changes the state of the corresponding voice message (including deletion). Here, when the user hangs up without selecting to store or delete the new or stored message, it is treated as storing in general.

When a user accesses the voice mail server, hears a new or stored message stored in the user's voice mailbox, and then hangs up in step 420, the voice mail server checks whether or not the state change in the voice mailbox for the corresponding user terminal occurred in step 430. The state change in the voice mailbox in the voice mail server occurs (excluding when a new message arrives), when a new message is stored, when a new message is deleted, or when a stored message is deleted, as described above. In the embodiment of the present invention, when the state change in the voice mailbox of the voice mail server occurs, a short message indicating the change is formed and then sent to the corresponding user terminal in steps 440 and 450.

Here, there are two methods for indicating the state change. One is to send the message ID of the message for which the state changed from the new state to the stored state, and the message ID of the message in the new or stored state that was deleted, through a short message. The other is to send the message IDs of new and stored messages stored after the state change of the voice mailbox in the voice mail server, through a short message.

It is preferable that for the state change of the voice mailbox in the voice mail server, the changing situation or the changed situation is sent in one short message. At this time, the short message must include all message IDs of the messages for which the state changed, or all message IDs which are stored in the voice mailbox after the state change. However, a case in which only one message ID can be included in a short message can happen according to application fields, and in such a case, a short message having one message ID is sent a plurality of times. The detailed protocol data structure of a short message formed in step 440 will be explained in FIG. 6.

Next, the user terminal receives the short message sent from the voice mail server in step 460. According to the state change information of the voice mailbox in the voice mail server included in the received short message, the user terminal modifies or deletes information about the new or stored messages of the voice mailbox in the user terminal in step 470. Here, referring to the message ID of each message included in the received short message, the user terminal changes the state of each message stored in the voice mailbox of the user terminal.

Then, optionally, the state change in the voice mailbox of the user terminal can be shown on the screen of the user terminal together with an alarm sound in step 480. At this time, it is preferable that messages stored in the voice mailbox of the user terminal are displayed after being divided into new messages and stored messages.

So far, a voice mailbox management method using a short message notifying the user terminal of the change of state of the voice mailbox in a voice mail server, has been explained. A voice mailbox management method using a short message indicating modification or deletion of information in the voice mailbox in a user terminal will now be explained.

FIG. 5 is a flowchart showing a voice mailbox management method using a short message indicating modification of information in a user terminal according to a preferable embodiment of the present invention.

First, when a user determines that a voice message stored in the voice mailbox of the voice mail server does not need to be stored any more, the user inputs a command to delete the voice message stored in the voice mailbox of the user terminal in step 500. Then, information about the voice message stored in the voice mailbox of the user terminal is modified or deleted according to the user command input in step 510. Modification of information in the voice mailbox of a user terminal occurs generally in the form of deleting a voice message. Since each voice message is managed through a message ID, a new message and a stored message do not need to be distinguished.

Here, deletion can be performed through selective deletion of an individual message or through deletion of all of the messages. Unlike the previous art, according to the embodiment of the present invention, even when information in the voice mailbox of the user terminal is modified through individual deletion or entire deletion of a new or a stored message stored in the voice mailbox of the user terminal, a short message to notify the voice mail server of the modification of information in the voice mailbox of the user terminal, is formed and sent to the voice mail server in steps 520 and 530. Here, when all messages are deleted, only the fact of entire deletion need be notified, and when an individual message is deleted, the message ID of the deleted message is included in the short message. In addition, when a plurality of messages are deleted through individual deletion, it is preferable that message IDs of all of the deleted messages are included in one short message. Unlike this, when only one message ID can be included in one short message, a plurality of short messages, each of which includes one deleted message ID, can be sent.

In addition, it is preferable that the state change of the voice mailbox of a user terminal is indicated through the message ID for a deleted message. However, as the case may be, a method in which message IDs of new and stored messages stored in the voice mailbox of the user terminal after individual deletion are indicated can be used. The detailed protocol data structure of a short message formed in the step 520 will be explained in FIG. 6.

Next, the voice mail server receives the short message sent from the user terminal in step 540. According to the modification information included in the received short message, the state of a new or stored message in the voice mailbox of the voice mail server for the corresponding user terminal, is modified in step 550. Here, referring to the message ID of each message included in the received short message, changing the state of each message stored in the voice mailbox of the voice mail server for the corresponding user terminal, is performed.

Since in the embodiment of the present invention in FIG. 5, a user leads the state change of the voice mailbox of the voice mail server without call connection to the voice mail server, the voice mail server does not need to resend to the user terminal a short message indicating the state change of the voice mailbox in the voice mail server.

So far, the voice mailbox management method according to the embodiments of the present invention has been explained. The detailed protocol data structure of a short message according to the embodiment of the present invention will now be explained.

FIGS. 6A through 6F are schematic diagrams showing the detailed protocol data structure of a short message used in the voice mailbox management method according to the embodiments of the present invention.

FIGS. 6A through 6F shows an example of the protocol data structure of a short message used in the voice mailbox management method according to the embodiments of the present invention and is drawn based on a voice mail notification (VMN) protocol, which is a point-to-point message type protocol for a short message service (SMS). However, FIGS. 6A through 6F are intended to show an example in which the embodiments of the present invention are implemented maintaining compatibility with the previous system, and the present invention is not limited to the protocol data structure shown in FIGS. 6A through 6F. It is more preferable that the embodiments of the present invention are implemented after defining a new protocol data structure.

FIG. 6A is a schematic diagram showing a point-to-point type message for SMS. SMS_MSG_TYPE 601 is 8-bits long, and represents the SMS message type.

Current SMS message types include a point-to-point method, a broadcast method and a receipt acknowledge method. It is preferable that a point-to-point method is applied to the embodiments of the present invention.

Fields 602 through 608 show the structure of a short message used in a point-to-point type message. TELESERVICE ID field 602 represents the service type in SMS point-to-point type message. The current SMS point-to-point type message supports service types of Cellular Paging Teleservice (CTP)-95, Cellular Messaging Teleservice (CMT)-95, and VMN-95. As shown in FIG. 6A, each of fields 602 and 608 is formed of an 8-bit ID field 602A and 608A, 8-bit fields 602B and 608B, and data fields 602C and 610. Here, the ID field 602A and 608A is a parameter identifier of each field, the length fields 602B and 608B represent the byte length of the data fields 602C and 610, and the data fields 602C and 610 are data fields corresponding to the kind of each parameter. Together the sending address 603 and sending sub address 604 form the network address of a source, and receiving address 605 and receiving sub address 606 form the network address of a destination. Bearer reply option 607 is a parameter requesting feedback of an SMS reply message. Bearer data field 608 is a data field complying with each bear type of an actual SMS message.

FIG. 6B illustrates the internal structure of a data field 610 inside a bearer data field 608 of an SMS point-to-point type VMN service.

As shown in FIG. 6B, a short message identifier field 611 in the field 610 is formed with an 8-bit ID field 611A, an 8-bit field 611B, and a data field 611C. Here, the ID field 611A is a parameter identifier of each sub field, the length field 611B represents the length in bytes of the data field 611C, and the data field 611C is a data field complying with the kind of each sub parameter.

A VMN message includes a short message identifier 611 for distinguishing the kind of each short message; user data 620 having data information provided by a user; a timestamp 613 showing the arrival time of a corresponding voice message to a voice mail server (depending on circumstances, the time of notification of the arrival of a corresponding voice message to a short message center which is responsible for sending a short message to a user terminal); the number of messages 614 showing the total number of new messages currently stored in a voice mail server; and a callback number 615.

FIG. 6C illustrates the internal structure of a user data field 620 of FIG. 6B. As shown in FIG. 6C, the user data field 620 is internally formed of an 8-bit ID field 621, an 8-bit field 622, a message encoding method field 623, a message type field 624, a length information field 625, and a CHARi field 630.

The ID field 621 represents the parameter identifier of each sub field and the length field 622 represents the byte length of a data field. 5-bit message encoding (MSG_ENCODING) method field 623 represents a character coding method, a 0-bit or 8-bit message type field 624 represents a message type, and an 8-bit information field 625 represents length information. Among user data fields in bearer data for a VMN server in an SMS point-to-point type message, the CHARi field 630 can include information when needed by a user. So far, details on the CHARi field 630 have not been disclosed, and the embodiment of the present invention can be implemented utilizing the CHARi 630 field. However, as described above, implementation of the embodiment of the present invention using the CHARi field 630 is only an example and the present invention should not be regarded as being limited to this.

Figure 6D:
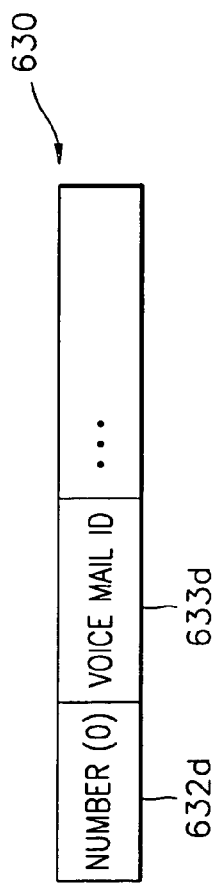

FIG. 6D illustrates an exemplary implementation having the message ID of a new voice message included in the CHARi field 630 in the embodiment described in FIG. 3 (hereinafter referred to as the first embodiment).

In order to send the message ID of a new message according to the present invention in the previous VMN service, the first embodiment can be implemented utilizing the CHARi field 630 as shown in FIG. 6D. When a plurality of newly-arrived voice messages exist and a method in which a short message indicating the indicating the arrival of each new voice message is sequentially transmitted, only one voice mail ID field 633D is required. However, when the arrival of all new voice messages stored in the voice mailbox of a voice mail server are indicated through one short message, a plurality of voice mail ID fields 633D are required and optionally a number field 632D for showing the number of voice mail IDs. In the meantime, since the number field 632D in the CHARi field 630 performs a function similar to the message number field 614 of FIG. 6B, the message number field 614 of FIG. 6B can be used without a separate number field 632D in the CHARi field 630. In addition, in order to maintain coherence to the short message format used in FIGS. 6E and 6F, op_codes for indicating the arrival of new messages can be included, which is not shown in FIG. 6D.

So far, the first embodiment having a message ID in CHARi field 630 has been explained. Also, a modified embodiment in which an addition field is included in the data field 610 of the bearer data field 608, in addition to the user data field 620, can be implemented. It is more preferable that a new bearer data field 608 is defined according to a new service type of an SMS point-to-point type message having the message ID of a new message according to the present invention, after defining the new service type, which can be distinguished from the previous voice mail notification service that does not have the message ID of a new message.

Figure 6E:
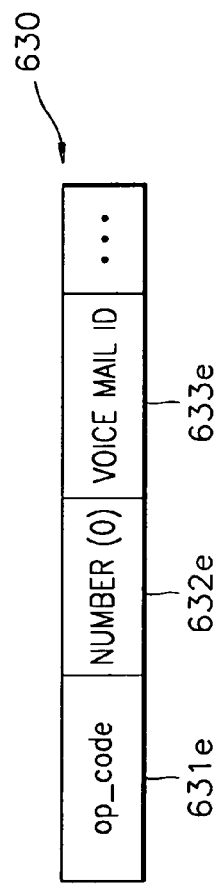

FIG. 6E illustrates a short message structure utilizing the CHARi field 630 which can be used in the embodiment described in FIG. 5 (hereinafter, referred to as the second embodiment). Here, a method utilizing the previous VMN service is shown, and the present invention is not limited to this. op_code 631E is a code for distinguishing partial deletion and entire deletion, and voice mail ID 633E is for showing the message ID of a message deleted in the voice mailbox of a user terminal. When a plurality of voice messages are deleted individually, a plurality of voice mail ID fields are used, and the number field 632E shows the total number of voice mail IDs included in a short message. When the op_code 631 indicates deletion of all messages, the number field 632C and the voice mail ID field 633E are not used. In a modified embodiment in which one message ID can be included in one short message, the number field 632E does not need to be used. In addition, in a modified embodiment, in which the state change in the voice mailbox of the user terminal is indicated through the message IDs of new and stored messages stored in the voice mailbox of the user terminal after state changes, instead of the message ID of a deleted message, it is preferable that the short message type to be explained in FIG. 6F is used.

So far, the second embodiment having a message ID in the CHARi field 630 has been explained. It is more preferable that for a person skilled in the art, a new bearer data 608 is defined according to the new service type of an SMS point-to-point type message indicating the state change of the voice mailbox of a user terminal, which can be distinguished from the VMN service indicating the arrival of a new message, after defining the new service type.

Figure 6F:
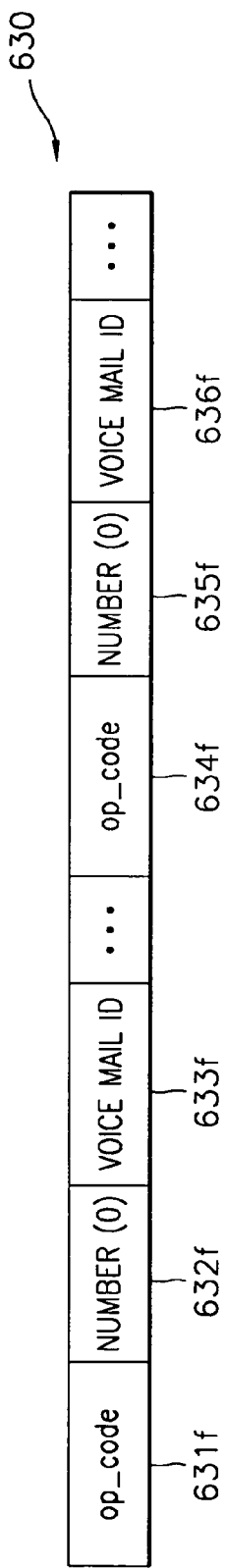

FIG. 6F illustrates the short message structure utilizing the CHARi field 630 which can be used in the embodiment shown in FIG. 4 (hereinafter, referred to as the third embodiment). Here, a method utilizing the previous VMN service is shown, and the present invention is not limited to this. In the third embodiment, available methods indicating the state change of the voice mailbox of a voice mail server to a user terminal include a method indicating the message ID of a message stored in a new state, and the message ID of a message deleted in a new state or in a stored state (hereinafter, referred to as a changed message notification method); and a method indicating the message ID of a new or stored message after the state change (hereinafter, referred to as a state message notification method), which is as described above.

In the changed message notification method, the first op_code 631F represents storing, the second op_code 634F represents deletion, the first number 632F represents the number of stored messages, the first voice mail ID 633F represents the ID of a stored message, the second number 635F represents the number of deleted messages, and the second voice mail ID 636F represents the ID of a deleted message. The locations of storing and deletion can be swapped. In a modified embodiment in which one message ID can be sent at a time, the protocol data structure has one op_code 631F and one voice mail ID 633F.

In the state message notification method, the first op_code 631F represents a new message, the second op_code 634F represents stored message, the first number 632F represents the number of new messages, the first voice mail ID 633F represents the ID of a new message, the second number 635F represents the number of stored messages, and the second voice mail ID 636F represents the message ID of a stored message. This method is similar to the changed message notification method in that the location for new message and stored message can be swapped, and in the protocol data structure for a modified embodiment in which one message ID can be sent at a time, So far, the third embodiment having the message ID in the CHARi field 630 has been explained. It is clear to a person skilled in the art that, more preferably, a new bearer data 608 is defined according to the new service type of an SMS point-to-point type message indicating the state change of the voice mailbox of a user terminal, which can be distinguished from the VMN service indicating the arrival of a new message, after defining the new service type. In addition, FIGS. 6A through 6F illustrate examples utilizing the CHARi field 630 according to the present invention, and a variety of modifications in implementation can be made, which is clear to a person skilled in the field of the present invention.

The voice mailbox management method in a voice mail system according to preferable embodiments of the present invention can be embodied in a program which runs in a general purpose digital computer and can be executed in a general purpose digital computer by reading this program from a computer-readable storage medium. Such storage media includes such as magnetic storage media (e.g., ROM's, floppy disks, hard disks, etc.), optically readable media (e.g., CD-ROMs, DVDs, etc.) and carrier waves (e.g., transmissions over the Internet), but is not limited to these storage media.

According to the present invention, when the state change of the voice mailbox in a voice mail server occurs, a short message indicating the change is sent to a user terminal and when the state change of the voice mailbox of a user terminal occurs, a short message indicating the state change is sent to a voice mail server. In accordance with the received short message, the state of the voice mailbox of the voice mail server or the user terminal is modified, which enables identical information to be maintained in the voice mail boxes of both the user terminal and the voice mail server.

According to the present invention, therefore, confusion caused by incoherence between mailboxes of a user terminal and a voice mail server can be prevented, and the effective management of a voice mailbox in a voice mail system is enabled. In addition, an efficient voice mailbox management method, which can be easily implemented, in which a message identifier is assigned to each voice message and each voice message is managed through the message identifier, is provided.

While this invention has been particularly shown and described with reference to preferred embodiments thereof, it will be understood by those skilled in the art that various changes in form and details may be made therein without departing from the spirit and scope of the invention as defined by the appended claims. Therefore, while the disclosed embodiments are not limiting, but explaining the present invention, the scope of the present invention is disclosed in the appended claims and variations within the scope equivalent to the present invention should be deemed to be included in the present invention.

What is claimed is:

1. A voice mailbox management method in a user mobile telecommunications terminal using a short message, the voice mailbox management method comprising the steps of:
   (a) accessing a voice mail server, receiving a new or previously stored voice message stored in a voice mailbox of the voice mail server, and outputting the voice message to a user;
   (b) sending to the voice mail server a user input for storing the new voice message or deleting the new or previously stored voice message stored in the voice mailbox of the voice mail server, and finishing the access to the voice mail server;
   (c) when a state change in the new or previously stored voice message stored in the voice mailbox of the voice mail server occurs due to the user input sent in the step (b), receiving from the voice mail server a short message indicating the state change of the new or previously stored voice message stored in the voice mailbox of the voice mail server, wherein the short message comprises a message identifier of the new or previously stored voice message stored in the voice mailbox of the voice mail server; and
   (d) according to the state change of the voice message stored in the voice mailbox of the voice mail server, which is indicated through the short message received in the step (c), modifying information regarding the new or previously stored voice message stored in the voice mailbox of the user mobile telecommunication terminal.

2. A voice mailbox management method in a user mobile telecommunications terminal using a short message of, the voice mailbox management method comprising the steps of:
   (a) accessing a voice mail server, receiving a new or previously stored voice message stored in a voice mailbox of the voice mail server, and outputting the voice message to a user;

(b) sending to the voice mail server a user input for storing the new voice message or deleting the new or previously stored voice message stored in the voice mailbox of the voice mail server, and finishing the access to the voice mail server;

(c) when a state change in the new or previously stored voice message stored in the voice mailbox of the voice mail server occurs due to the user input sent in the step (b), receiving from the voice mail server a short message indicating the state change of the new or previously stored voice message stored in the voice mailbox of the voice mail server, wherein the short message comprises at least one of a message identifier of a voice message which was changed from a new state to a stored state, and a message identifier which was deleted from a new state or a stored state in the voice mailbox of the voice mail server; and (d) according to the state change of the voice message stored in the voice mailbox of the voice mail server, which is indicated through the short message received in the step (c), modifying information regarding the new or previously stored voice message stored in the voice mailbox of the user mobile telecommunication terminal.

3. The voice mailbox management method using a short message of claim 2, wherein the short message received in the step (c) comprises a message identifier of a voice message in a bearer data field of a point-to-point type message for a short message service; and the step (d) further comprises referring to the message identifier of the voice message in the bearer data field of the point-to-point type message for the short message service, and modifying information about the voice message having the message identifier among information regarding voice messages stored in the voice mailbox of the user mobile telecommunications terminal.

4. A voice mailbox management method in a voice mail server using a short message, the voice mailbox management method comprising the steps of:

(a) sending a new or previously stored voice message stored in a voice mailbox of the voice mail server to a user mobile telecommunications terminal connected to the voice mail server;

(b) receiving a command for storing a new voice message or for deleting a new or previously stored voice message stored in the voice mailbox of the voice mail server, from the user mobile telecommunications terminal connected to the voice mail server;

(c) changing a state of the new or previously stored voice message stored in the voice mailbox of the voice mail server in accordance with the command received in the step (b); and (d) sending to the user mobile telecommunications terminal a short message indicating the state of the new or previously stored voice message stored in the voice mailbox of the voice mail server changed in the step (c), wherein the short message comprises a message identifier of the new or previously stored voice message stored in the voice mailbox of the voice mail server.

5. A voice mailbox management method in a voice mail server using a short message, the voice mailbox management method comprising the steps of:

(a) sending a new or previously stored voice message stored in a voice mailbox of the voice mail server to a user mobile telecommunications terminal connected to the voice mail server;

(b) receiving a command for storing a new voice message or for deleting a new or previously stored voice message stored in the voice mailbox of the voice mail server, from the user mobile telecommunications terminal connected to the voice mail server;

(c) changing a state of the new or previously stored voice message stored in the voice mailbox of the voice mail server in accordance with the command received in the step (b); and (d) sending to the user mobile telecommunications terminal a short message indicating the state of the new or previously stored voice message stored in the voice mailbox of the voice mail server changed in the step (c), wherein the short message comprises at least one of a message identifier of the new voice message which was changed from a new state to a stored state, and a message identifier of the new or previously stored voice message which was changed to a deleted stated.

6. The voice mailbox management method using a short message of claim 5, wherein the step (d), comprises sending the message identifier of the new or previously stored voice message in a bearer data field of a point-to-point type message for a short message service.

7. A voice mailbox management method for a voice mail server using a short message, the voice mailbox management method comprising the steps of:

(a) changing a state of a new or previously stored voice message stored in a voice mailbox of the voice mail server in accordance with a command received from a user mobile telecommunications terminal;

(b) forming a Short Message Service (SMS) message including an indication of the state of the new or previously stored voice message stored in the voice mailbox of the voice mail server changed in the step (a), and a message identifier of the new or previously stored voice message stored in the voice mailbox of the voice mail server; and (c) sending the short message formed in the step (b), including the message identifier message and the indication, to the user mobile telecommunications terminal from the voice mail server.

8. The voice mailbox management method of claim 7, wherein in the step (b), the message identifier and the indication are formed in a user data field in a bearer data field of a point-to-point type message for a short message service.

9. A voice mailbox management method using a Short Message Service (SMS) message for a user mobile telecommunications terminal, the voice mailbox management method comprising the steps of:

(a) receiving user input modifying information regarding a new or previously stored voice message stored in a voice mailbox of the user mobile telecommunications terminal;

(b) modifying information of the new or previously stored voice message stored in the voice mailbox of the user mobile telecommunications terminal, according to the user input modifying information received in the step (a);

(c) forming an SMS message notifying the voice mail server of the modification of the information regarding the new or previously stored voice message stored in the voice mailbox of the user mobile telecommunications terminal; and (d) sending the SMS message, formed in the step (c), notifying the voice mail server of the modification of the information regarding the new or previously stored voice message stored in the voice mailbox of the user mobile telecommunications terminal.

10. The voice mailbox management method of claim 9, wherein the user input modifying information is an instruction for deleting a new or previously stored voice message stored in the voice mailbox of the user mobile telecommunications terminal; the step (b) comprises deleting information of the new or previously voice message stored in the voice mailbox of the user mobile telecommunications terminal; and the step (c) comprises forming the SMS message including the message identifier of the voice message of which information was deleted in the step (b) in the bearer data field of a point-to-point type for the SMS.

11. A voice mailbox management method of a voice mail server using a Short Message Service (SMS) message, the voice mailbox management method comprising the steps of:
   (a) receiving an SMS message indicating a modification of information of a new or previously stored message stored in a voice mailbox of a user mobile telecommunications terminal from the user mobile telecommunications terminal; and
   (b) changing a state of the new or previously stored voice message stored in the voice mailbox of the user mail server, according to the modification of the information of the voice message stored in the voice mailbox of the user mobile telecommunications terminal, which was notified through the SMS message received in the step (a).

12. The voice mailbox management method of claim 11, wherein in the step (a), an SMS message including a message identifier of the new or previously received voice message, which has been deleted, in the bearer data field of a point-to-point type message for the SMS is received, as information about the new or previously stored message stored in the voice mailbox of the user mobile telecommunications terminal which has been changed due to the deletion of a new or previously stored message stored in the voice mailbox of the user mobile telecommunications terminal; in the step (b), the state of the new or previously stored voice message having the message identifier is changed, referring to the message identifier of the voice message in the bear data field of a point-to-point type message for the SMS, included in the SMS message received in the step (a).

13. A computer readable medium having embodied thereon a computer program for a voice mail system, between a user mobile telecommunications terminal and a voice mail server, managing voice mailboxes using a short message, wherein the voice mailbox management method comprises the steps of:
   (a) receiving a new or previously stored voice message stored in a voice mailbox of the voice mail server, and outputting the voice message through the user mobile telecommunications terminal;
   (b) sending a user input for storing the new voice message or deleting the new or previously stored voice message stored in the voice mailbox of the voice mail server, to the voice mail server, and finishing the access to the voice mail server;
   (c) when a state change in a voice message stored in the voice mailbox of the voice mail server occurs due to the user input sent in the step (b), receiving from the voice mail server a short message notifying the state change of the new or previously stored voice message stored in the voice mailbox of the voice mail server, wherein the short message comprises a message identifier of the new or previously stored voice message stored in the voice mailbox of the voice mail server; and
   (d) according to the state change of the new or previously voice message stored in the voice mailbox of the voice mail server, which is indicated through the short message received in the step (c), modifying information regarding the new or previously stored voice message stored in the voice mailbox of the user mobile telecommunication terminal.

14. A computer readable medium having embodied thereon a computer program for a voice mail system, between a user mobile telecommunications terminal and a voice mail server, managing voice mailboxes using a short message, wherein the voice mailbox management method comprises the steps of:
   (a) sending a new or previously stored voice message stored in a voice mailbox of the voice mail server to a user mobile telecommunications terminal connected to the voice mail server;
   (b) receiving a command for storing the new voice message or for deleting the new or previously stored voice message stored in the voice mailbox of the voice mail server, from the user mobile telecommunications terminal connected to the voice mail server;
   (c) changing a state of a voice message stored in the voice mailbox of the voice mail server in accordance with the command received in the step (b); and
   (d) sending a short message indicating the state of the voice message stored in the voice mailbox of the voice mail server changed in the step (c), to the user mobile telecommunications terminal, wherein the short message comprises a message identifier of the new or previously stored voice message stored in the voice mailbox of the voice mail server.

15. A computer readable medium having embodied thereon a computer program for a voice mail system, between a user mobile telecommunications terminal and a voice mail server, managing voice mailboxes using a short message, wherein the voice mailbox management method comprises the steps of:
   (a) changing a state of a new or previously stored voice message stored in a voice mailbox of the voice mail server in accordance with a command received from a user mobile telecommunications terminal;
   (b) forming a Short Message Service (SMS) message including an indication of the state of the new or previously stored voice message stored in the voice mailbox of the voice mail server changed in the step (a) and a message identifier of the new or previously stored voice message stored in the voice mailbox of the voice mail server message; and
   (c) sending the short message formed in the step (b), including the identifier of the and the indication, to the user mobile telecommunications terminal from the voice mail server.

16. A computer readable medium having embodied thereon a computer program for a voice mail system, between a user mobile telecommunications terminal and a voice mail server, managing voice mailboxes using a Short Message Service (SMS) message, wherein the voice mailbox management method comprises the steps of:
   (a) receiving a user input modifying information regarding a new or previously stored voice message stored in a voice mailbox of the user mobile telecommunications terminal;
   (b) modifying information of the new or previously received voice message stored in the voice mailbox of the user mobile telecommunications terminal, according to the user input modifying information received in the step (a);

(c) forming an SMS message notifying the voice mail server of the modification of the information of the new or previously received voice message stored in the voice mailbox of the user mobile telecommunications terminal; and (d) sending the SMS message, formed in the step (c), notifying the voice mail server of the modification of the information regarding the new or previously received voice message stored in the voice mailbox of the user mobile telecommunications terminal.

17. A computer readable medium having embodied thereon a computer program for a voice mail system, between a user mobile telecommunications terminal and a voice mail server, managing voice mailboxes using a Short Message Service (SMS) message, wherein the voice mailbox management method comprises the steps of:

(a) receiving an SMS message indicating the modification of information on a new or previously stored message stored in a voice mailbox of a user mobile telecommunications terminal from the user mobile telecommunications terminal; and (b) changing a state of a voice message stored in the voice mailbox of the user mail server, according to the modification of the information of the voice message stored in the voice mailbox of the user mobile telecommunications terminal, which was notified through the SMS message received in the step (a).

* * * * *